United States Patent
Mollmann et al.

(10) Patent No.: US 6,909,948 B2
(45) Date of Patent: Jun. 21, 2005

(54) ACCELEROMETER CONFIGURATION

(75) Inventors: Daniel E. Mollmann, Cincinnati, OH (US); Gert ven der Merwe, Monroe, OH (US)

(73) Assignee: General Electric Company, Schenectady, NY (US)

( * ) Notice: Subject to any disclaimer, the term of this patent is extended or adjusted under 35 U.S.C. 154(b) by 8 days.

(21) Appl. No.: 10/426,185

(22) Filed: Apr. 30, 2003

(65) Prior Publication Data

US 2004/0220709 A1 Nov. 4, 2004

(51) Int. Cl.[7] .......... G01W 1/00; G01N 31/00; B63H 3/00; G01M 1/00
(52) U.S. Cl. .......... 701/29; 701/34; 701/3; 416/37; 416/38; 416/61; 73/455; 73/462
(58) Field of Search .......... 701/29, 34, 3; 416/37, 38, 61; 73/455, 462

(56) References Cited

U.S. PATENT DOCUMENTS

| | | | | |
|---|---|---|---|---|
| 4,010,637 A | * | 3/1977 | Harwell et al. | 73/658 |
| 4,751,657 A | * | 6/1988 | Imam et al. | 702/35 |
| 5,419,198 A | * | 5/1995 | Pla | 73/660 |
| 5,586,065 A | * | 12/1996 | Travis | 702/191 |
| 5,627,751 A | * | 5/1997 | Davis et al. | 701/29 |
| 5,893,892 A | * | 4/1999 | Loeffler | 701/29 |
| 6,005,315 A | * | 12/1999 | Chapman | 310/90.5 |
| 6,445,995 B1 | | 9/2002 | Mollmann | 701/100 |
| 6,491,497 B1 | | 12/2002 | Allmon et al. | 416/174 |
| 6,574,572 B2 | * | 6/2003 | Bechhoefer | 702/56 |
| 2003/0045976 A1 | * | 3/2003 | Bechhoefer | 701/29 |
| 2003/0066352 A1 | * | 4/2003 | Leamy et al. | 73/593 |
| 2004/0001015 A1 | * | 1/2004 | Games | 341/112 |

* cited by examiner

*Primary Examiner*—Thomas G. Black
*Assistant Examiner*—Brian J Broadhead
(74) *Attorney, Agent, or Firm*—William Scott Andes; Barbara Joan Haushalter

(57) ABSTRACT

The present invention provides a system and method for using the external accelerometer in an aircraft engine configuration as a backup accelerometer, in the event the internally located production accelerometer fails. The sensor location of the external accelerometer has an acceptable sensitivity to fan imbalance, similar to the location of the former alternate accelerometer. The signal from this external accelerometer is duplicated using software in the signal conditioning hardware, creating the second, alternate signal. As an alternative embodiment, the signal may be duplicated by simply teeing or branching the original signal, using hardware rather than software.

18 Claims, 1 Drawing Sheet

ACCELEROMETER CONFIGURATION

BACKGROUND OF THE INVENTION

The present invention relates to vibration monitoring for aircraft engines and, more particularly, to an accelerometer configuration for measurement of system vibration and indication of engine health for the aircraft engine.

Typical commercial engines have two accelerometers and an associated signal conditioning system to monitor engine health and provide an indication of vibration to the flight crew. On most engines, one of the accelerometers is positioned internally to the engine, at a bearing that is often the most sensitive location to fan imbalance. Since this sensor is internally located, if it fails, a third "alternate" external sensor is usually installed on the fan frame or other external location as a temporary replacement until the next engine teardown when the internally located accelerometer can be replaced. Although the alternate external location is generally not as sensitive to fan imbalance as the internally located sensor, it is still sensitive enough to provide an indication of engine health. The difference in the sensitivity of the location, measurable in g's of response, is typically somewhat compensated by installing an accelerometer with a more sensitive output, such as pico-coulomb of charge output per g of vibration.

In order to install the alternate accelerometer, the airline or other user needs to stock it as a spare part and maintain it in inventory. Further, to actually install the alternate accelerometer, the engine cowling must be opened, and the accelerometer bolted on, and hooked up with an electrical cable to carry the signal. A mounting pad or bracket also needs to be provided on the engine in order to mount the accelerometer. Engine fan balance coefficients are typically different with the alternate sensor, as compared to the originally internally located sensor, and this difference must be accommodated in the vibration system balance software at the time the alternate accelerometer is installed. All of these requirements are necessarily a maintenance burden.

While the first of the two original accelerometers is typically located internally at a location most sensitive to fan imbalance, the second, of the original two accelerometers is typically externally located on a casing or frame, for instance, but not limited to the Turbine Center Frame (TCF), Compressor Rear Frame (CRF), Turbine Rear Frame (TRF), Low Pressure Turbine (LPT) casing, TEC (Turbine Exhaust Case), or HPC (High Pressure Compressor) case. If this second of the two original accelerometers fails, it is simply replaced when convenient, usually within the next couple of flights, and does not require an alternate accelerometer.

It would be desirable to provide an accelerometer configuration that requires less than the currently required two production accelerometers and the third alternate accelerometer that is installed on the engine if the internal accelerometer fails.

BRIEF DESCRIPTION OF THE INVENTION

A system and method are proposed for eliminating the need for the alternate accelerometer. This improved accelerometer configuration uses the original external accelerometer as a backup accelerometer to the fan imbalance location accelerometer, rather than installing an alternate accelerometer. Thus, only the two production accelerometers are required to accomplish all the purposes currently achieved with three accelerometers.

Accordingly, the present invention provides a system and method for using the external accelerometer as a backup accelerometer in the event the internally located production accelerometer fails. The sensor location of the external accelerometer has an acceptable sensitivity to fan imbalance, similar to the location of the former alternate accelerometer. The signal from this external accelerometer is duplicated using software in the signal conditioning hardware, creating the second, alternate signal. As an alternative embodiment, the signal may be duplicated by simply teeing or branching the original signal, using hardware rather than software.

DETAILED DESCRIPTION OF THE INVENTION

Figure 1:
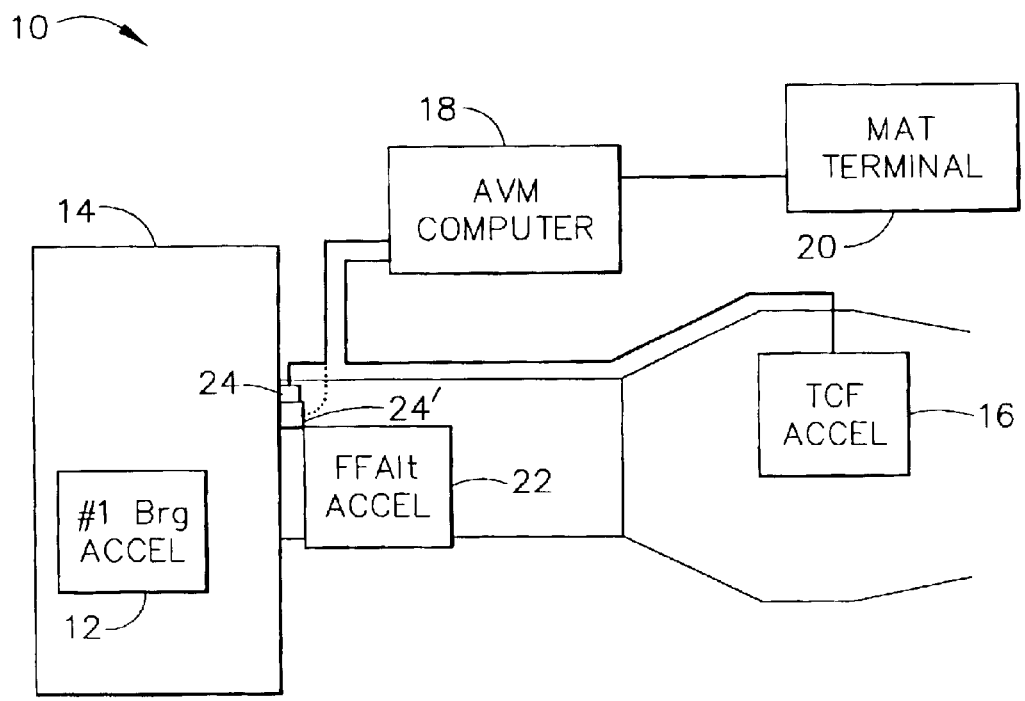
FIG. 1 is a block diagram illustration of a prior art accelerometer configuration.

Referring to FIG. 1, there is illustrated a block diagram of a typical accelerometer configuration of a prior art system 10 for an aircraft engine. In FIG. 1, a first production accelerometer 12 is internally located, typically at the most sensitive location to fan imbalance, such as at the forward most bearing, which is nearest the fan rotor. A second production accelerometer, or external accelerometer, 16 is externally located, for instance on the TCF as shown, although it may be externally located elsewhere such as on the CRF or TRF. Both accelerometers 12 and 14 are associated with a vibration monitoring computer 18, typically located in the electronics bay of the aircraft, or mounted on the engine. The accelerometer signals are typically processed by electronic signal conditioning hardware in the vibration monitoring computer 18 that performs functions such as determining the synchronous vibration levels, calculating balance weights needed to balance the engine, scaling vibration amplitudes for cockpit display, storing data for later retrieval, generating maintenance messages, and other functions. A Maintenance Access Terminal (MAT) 20 is associated with the vibration monitoring computer, to allow a mechanic or other person to access the data and interface in other ways with the vibration monitoring computer.

In a prior art system such as is shown in FIG. 1, a third, alternate, accelerometer 22 is installed if the internally located accelerometer 12 fails. Because the location of accelerometer 22 makes it less sensitive to fan imbalance than the internally located accelerometer 12, accelerometer 22 may have a more sensitive crystal, on the order of 150 pc/g (pico-coulomb of electrical charge per g of acceleration), as compared to a typical 50 pc/g for accelerometer 12, to compensate for the less sensitive location. The connector location 24 for the vibration monitoring computer can be moved to location 24' when the alternate accelerometer 22 is installed. Clearly, a high level of maintenance is required to accommodate the possibility of the installation of a third accelerometer 22. The engine cowling must be opened, the alternate sensor 22 installed, and the connector 24 moved. Additionally, the alternate sensor 22 must be maintained in inventory and provisions made on the engine for mounting it, such as a bracket or mounting pad. Further, the software configuration of the vibration monitoring computer must be modified to accommodate the different engine balance coefficients that need to be used with the alternate accelerometer.

Figure 2:
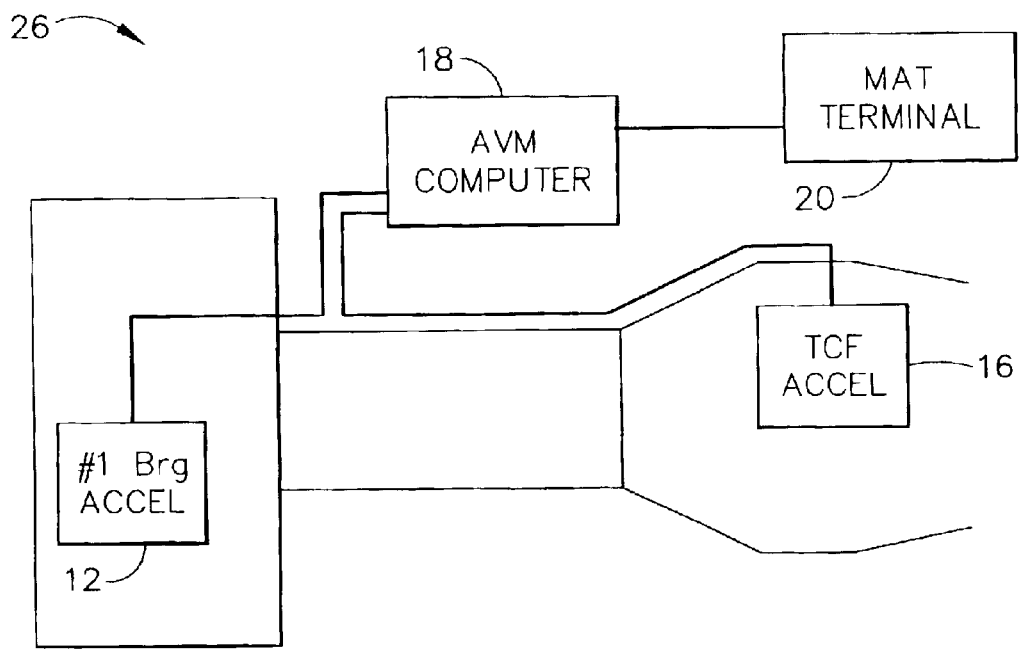
FIG. 2 is a block diagram of an accelerometer configuration in accordance with the present invention.

Referring now to FIG. 2, the present invention proposes a novel configuration 26 for eliminating the need for the alternate accelerometer 22 and the maintenance associated with this third accelerometer 22. In the proposed system 26, the external accelerometer 16 is used as a backup accelerometer to the accelerometer 12, instead of installing an alternate accelerometer 22. The accelerometer 16 then performs two functions, its original function of measuring vibrations caused by imbalances in other parts of the engine, such as the low pressure turbine, high pressure compressor and high pressure turbine, and the additional function of monitoring fan imbalance. The sensor location for external accelerometer 16 typically has an acceptable sensitivity to fan imbalance, similar to the location of the alternate accelerometer 22.

The external accelerometer signal is duplicated in the signal conditioning hardware, creating the second, alternate signal that replaces the internal accelerometer signal. This is accomplished simply with software in the signal conditioning computer. The software would simply define that the variable whose value represents the amplitude of the internal accelerometer is now instead equal to a scale factor (for example 2 or 3) times the amplitude of the external accelerometer. This scale factor would be chosen appropriately to provide an amplitude which is similar to the amplitude of the internal accelerometer. This is similar in concept to choosing the pc/g sensitivity of the alternate accelerometer in the prior art to be 3 times the sensitivity of the internal accelerometer.

An additional advantage of the present invention is that this scale factor could be made variable as a function of rotor speed or some other parameter. For example, the scale factor could be 2 for a certain range of rotor speeds, and 3 for another range of rotor speeds. This allows a better simulation of the original internal accelerometer response, since the amplitude or response of the internal accelerometer and these external accelerometers are generally not different by a constant ratio across the range of rotor speeds. Furthermore, the scaled value can be defined not only as a factor times the external accelerometer amplitude, but can also be specified to have a constant offset with respect to the amplitude of the external accelerometer. In fact, in a general sense, those skilled in the art will recognize that the amplitude of this new scaled value can be defined as any algebraic function of the amplitude of the external accelerometer's amplitude, providing the capability of producing a signal that much more closely simulates the original internal accelerometers response characteristics than could be achieved with the prior art approach of installing a third accelerometer at a new external location on the engine.

At the same time the software configuration change is made, a change can also be activated in the software to instruct the vibration computer to calculate fan balance weights using only the external accelerometer 16. This can eliminate time consuming procedures that typically must be performed to generate trim balance sensitivities with the alternate sensor.

In order to switch the vibration monitoring and balance functions of the signal processing computer to the alternate sensor, with the alternate sensor in this configuration being the accelerometer 16, the maintenance action would be merely to activate the software option. This would occur typically through an aircraft maintenance computer terminal located in the aircraft body, and associated with the signal processing computer. Such an action is clearly easier and quicker than physically installing an alternate accelerometer 22. In addition, with the configuration of system 26, the need for maintaining the alternate accelerometer in inventory is eliminated, routing of the lead is eliminated, and the need to provide a mounting location is eliminated. Hence, the accelerometer configuration of system 26 eliminates the need to install a third accelerometer on the engine, by producing the signal by means of software using the existing external accelerometer signal.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vibration measurement system for measuring vibration to detect rotor imbalance and monitor engine health for an aircraft engine, comprising:

an internally mounted accelerometer for detecting imbalance;

an external accelerometer for detecting rotor imbalance; and a signal conditioning computer including software for duplicating a signal from the external accelerometer function, modifying said signal by means of an algebraic, and using the modified signal to provide the function of the internally mounted accelerometer if said internally mounted accelerometer fails, and wherein the software defines that a variable whose value represents an amplitude of the internally mounted accelerometer is now equal to a scale factor times an amplitude of the external accelerometer.

2. A vibration measurement system as claimed in claim 1 wherein the internally mounted accelerometer detects fan imbalance.

3. A vibration measurement system as claimed in claim 1 wherein the external accelerometer detects vibration caused by imbalances in the aircraft engine.

4. A vibration measurement system as claimed in claim 1 wherein the algebraic function comprises a constant.

5. A vibration measurement system as claimed in claim 1 wherein the scale factor is chosen to provide an amplitude approximately like the amplitude of the internally mounted accelerometer.

6. A vibration measurement system as claimed in claim 1 wherein the scale factor comprises a variable scale factor.

7. A vibration measurement system as claimed in claim 6 wherein the variable scale factor is a function of rotor speed.

8. A vibration measurement system as claimed in claim 1 wherein the scale factor further comprises a scale factor having a constant offset with respect to the amplitude of the external accelerometer.

9. A vibration measurement system as claimed in claim 1 wherein the algebraic function comprises a scale factor.

10. A method for measuring vibration to detect rotor imbalance and monitor engine health for an aircraft engine, comprising the steps of:

mounting an internal accelerometer for detecting imbalance;

mounting an external accelerometer for detecting rotor imbalance;

providing a signal conditioning computer including software for duplicating a signal from the external accelerometer, modifying said signal by means of an algebraic function, and using the modified signal to provide the function of the internally mounted accelerometer if said internally mounted accelerometer fails; and providing an algebraic function that is a constant.

11. A method as claimed in claim 10 further comprising the step of providing an algebraic function that is a scale factor.

12. A method as claimed in claim 10 wherein the internally mounted accelerometer detects fan imbalance.

13. A method as claimed in claim 10 wherein the external accelerometer detects vibration caused by imbalances in the aircraft engine.

14. A method as claimed in claim 10 wherein the software defines that a variable whose value represents an amplitude of the internally mounted accelerometer is now equal to a scale factor times an amplitude of the external accelerometer.

15. A method as claimed in claim 14 wherein the scale factor is chosen to provide an amplitude approximately like the amplitude of the internally mounted accelerometer.

16. A method as claimed in claim 14 wherein the scale factor comprises a variable scale factor.

17. A method as claimed in claim 16 wherein the variable scale factor is a function of rotor speed.

18. A method as claimed in claim 14 further comprising the step of providing wherein a scale factor having a constant offset with respect to the amplitude of the external accelerometer.

* * * * *